United States Patent

[11] 3,622,537

[72] Inventors Donald G. Needham;
George R. Hill, both of Bartlesville, Okla.
[21] Appl. No. 805,854
[22] Filed Mar. 10, 1969
[45] Patented Nov. 23, 1971
[73] Assignee Phillips Petroleum Company

[54] STABILIZED CARBONIZABLE COMPOSITIONS
8 Claims, No Drawings
[52] U.S. Cl. .................................................... 260/41 B,
252/63.2, 252/63.5, 260/41.5 R, 260/45.75 R,
260/45.75 C, 260/45.85, 260/45.95
[51] Int. Cl. ........................................................ C08f 45/08,
C08f 45/56
[50] Field of Search ........................................... 252/63.2,
63.5; 260/41 B

[56] References Cited
UNITED STATES PATENTS
3,228,883  1/1966  Giulio et al. ................... 252/63.2
FOREIGN PATENTS
994,720  6/1965  Great Britain ................. 260/48.5

Primary Examiner—Morris Liebman
Assistant Examiner—J. H. Derrington
Attorney—Young and Quigg ABSTRACT: Polymeric compositions containing minor amounts of antioxidant, UV stabilizers and carbon black are rendered tracking resistant (breakdown under high voltage) by incorporating a metal oxide pigment and, optionally, magnesium oxide.

3,622,537

STABILIZED CARBONIZABLE COMPOSITIONS

BACKGROUND OF THE INVENTION

This invention relates to the preparation of polymeric compositions that are tracking resistant. In accordance with another aspect, this invention relates to improving the tracking resistance of carbon black-containing stabilized polymers by the incorporation of a metal oxide pigment. In accordance with a further aspect, this invention relates to improving the tracking resistance of carbon black-containing polyolefins stabilized with antioxidants and UV stabilizers by the addition of a large particle size metal oxide black pigment. In accordance with a further aspect, polyethylene containing minor amounts of carbon black, antioxidants and UV stabilizers are rendered tracking resistant (breakdown under high voltage) by incorporating a black metal oxide pigment and magnesium oxide.

In accordance with the invention, the resistance of carbonizable compositions, e.g., hydrocarbon polymers, to carbonization such as that promoted by high voltage arc tracking, is greatly improved by the addition of stabilizing amounts of heavy metal oxides selected from iron oxide ($Fe_3O_4$) and copper oxide (CuO), carbon blacks, with or without magnesium oxide, as well as chemical, e.g., oxidation and UV stabilizers such as hindered phenols and thioesters of long chain fatty alcohols.

Particularly high-tracking resistance is obtained, according to the invention, by the use of compositions containing up to about 1.5 weight percent metal oxides, up to about 1.25 weight percent carbon black, preferably having a relatively low average particle size and chemically stabilizing amounts of the phenols and thiols above mentioned. Unexpected improvement of the resistance of the compositions is observed by the further combination of up to about 2.0 weight percent magnesium oxide with the above-described compositions.

Carbonization of carbonizable materials under the influence of high-potential drops is generally recognized and is of particular concern in the selection and maintenance of electrical insulation materials. In application, the surfaces of such insulators accumulate dust, moisture, oils, etc., which results on the existence of a relative conductive layer on the outer surface of the insulator which, under the influence of sufficient potential drop, will "breakdown electrically" and allow the passage of current past the insulator through this relatively conductive surface layer. This problem is generally associated with accumulation of moisture on insulator surfaces. After the conductivity of the surface layer increases to a point at which current results, passage current will flow through the relatively conductive layer with the result that considerable heat is generated by the resistive dissipation of electrical energy. The heat thus developed ultimately results in decomposition or evaporation of the conductive medium. This current passage which often exists for only a very short period in the form of an electrical arc across the surface of the insulator results in very high temperature along the current path which in turn promotes carbonization of carbonizable insulator material. This carbonization in turn produces a carbon path along the surface of the insulator which, if allowed to develop under the influence of successive surface tracking breakdown cycles, will ultimately produce a continuously conductive path and allow continuous current passage or leakage along the surface of the insulator via the resultant carbon circuit. The manner in which such carbonization results by tracking breakdown and methods of evaluating insulator materials in view of their susceptibility of carbonization are discussed in the description of ASTM, standard designation: D 2132–62T issued 1962, entitled "Tentative Method of Test for Dust-and-Fog Tracking and Erosion Resistance of Electrical Insulating Materials."

We have found that the resistance of carbonizable materials to carbonization can be greatly improved through the use of minor amounts of metal oxides such as magnesium oxide, copper oxide, and iron oxide; carbon blacks; hindered phenols and thioesters of long chain fatty alcohols stabilizers in certain combinations.

It is therefore one object of this invention to provide a composition comprising a carbonizable material having increased resistance to carbonization.

It is another object of this invention to provide compositions having increased tracking resistance.

It is a further object of this invention to provide stabilized polyolefin compositions having increased tracking resistance.

Other objects and aspects, as well as the several advantages of the invention, will be apparent to those skilled in the art upon reading the specification and the appended claims.

SUMMARY OF THE INVENTION

These and other objects are obtained in accordance with this invention by adding to a carbonizable matrix minor amounts of at least one of a heavy metal oxide selected from iron oxide and copper oxide and mixtures of heavy metal oxides with magnesium oxide.

More specifically, according to the invention, polymers, especially polyolefins, containing minor amounts of carbon black, antioxidants and UV stabilizers are rendered tracking resistant by incorporating a heavy metal oxide such as iron oxide pigment or copper oxide, or both, and, optionally, magnesium oxide.

Further, in accordance with the invention, tracking resistant polyolefin compositions containing as antioxidant a hindered phenol and a thioester of a long chain fatty alcohol are prepared by the addition of a small particle size carbon black and a large size particle metal oxide black pigment with or without an effective amount of magnesium oxide.

Further in accordance with the invention, polyethylene containing minor amounts of 2,6-di-tert-butyl-4-methyl phenol and dilaurylthiodipropionate as antioxidants and UV stabilizers are rendered tracking resistant by incorporating a small particle size carbon black, a black metal oxide pigment and magnesium oxide at a preferred ratio of 1.25:1.25:1 weight percent based on weight of polyethylene resin.

If foamed products are desired, a foaming agent can be included in the above formulations.

DESCRIPTION OF THE PREFERRED EMBODIMENTS

Since by far the most widely employed carbonizable matrices which are subjected to environments that promote the carbonization of the matrix are natural and synthetic polymers, it is in combination with such polymers that the compositions of this invention find their broadest application. Such polymers are, for example, natural and synthetic elastomers and plastics. The most widely employed synthetic elastomers and plastics are those obtained by the polymerization of at least one olefin having from two to about eight carbon atoms. Such polymers are, for example: polyethylene; polybutene-1; polystyrene; ethylene-propylene copolymers; terpolymers of ethylene, propylene and dicyclopentadiene; styrene-butadiene copolymers; polyvinyl chloride; polytetrafluoroethylene; polyacrylonitrile; and the like.

Although these illustrations are exemplary of the polymers most widely employed as insulating materials, there are, of course, numerous others which, due to the nature of their use, are subjected to environments which result in carbonization. Essentially all carbon containing polymers, particularly those comprising the so-called carbon backbone in which at least a substantial number of the polymer linking units are subject to carbonization, can be stabilized by the compositions of this invention. Such polymers are, for example, the polycarbonates, polyesters, polyetheralcohols, polyamides, polyureas, polysulfones, poly(arylene sulfides), and the like.

Since the applications found by many of these materials usually require their subjection to adverse environmental influences such as oxidation and ultraviolet degradation, it is also desirable to inhibit the influence of these factors on the polymer matrix by the use of additional inhibitors such as hindered phenols exemplified by 2,6-di-tert-butyl-4-methyl phenol(BHT), thioesters of long chain fatty alcohols such as dilaurylthiodipropionate, and the like.

The hindered phenolic antioxidants that can be employed in the invention are compounds well known in the art and include the alkylated phenols. The alkylated phenols are compounds of the general formula

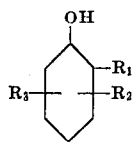

wherein $R_1$, $R_2$ and $R_3$ are alkyl groups which can be the same or different, each of which contains from one to 12 carbon atoms. Examples of such compounds are 2,4,6-trimethylphenol, 2,4,6-triisopropylphenol, 2,4,6-tri-tert-butylphenol, 2-tert-butyl-4,6-dimethylphenol, 2,6-methyl-4-dodecylphenol, 2,4,5-trimethylphenol, 2-tert-butyl-3,4-dimethylphenol, 2,6-di-tert-butyl-3-methylphenol, 2,6-di-tert-butyl-4-methylphenol, and the like.

The dialkyl esters of thiodicarboxylic acid are compounds of the general formula

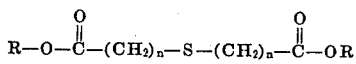

in which R is an alkyl group containing from eight to 18 carbon atoms and n is a number from 2 to 4, the R's being the same or different. Typical of these compounds and presently preferred is dilaurylthiodipropionate. Other useful compounds include dioctylthiodipropionate, dinonylthiodivalerate, didecylthiodibutyrate, dimyristylthiodipropionate, dicetylthiodibutyrate, distearylthiodivalerate, decyl-laurylthiodipropionate, octyl-stearylthiodibutyrate, nonylmyristylthiodivalerate, and the like. The addition of carbon black to such a formulation is also desirable in many instances to further deter degradation promoted by ultraviolet radiation. However, carbon blacks alone generally detract from the insulating capabilities of polymer matrices and result in insulators having lower tracking resistance. We have found, however, that this influence of the carbon black can be substantially deterred and that, in fact, the tracking resistance of polymer compositions containing carbon black can be greatly improved by the judicious selection of particular carbon blacks and their use in combination with metal oxide blacks and magnesium oxide and a preferred combination of antioxidants.

The metal oxide black pigments vary in composition ranging from 96 percent $FeO/Fe_2O_3$, analyzing a minimum 20 percent FeO in BK5099, to 100 percent $Fe_3O_4$; the preferred so-called iron oxide black is a mixture of 25 percent FeO, 22 percent CuO and 53 percent MgO, all by weight. The mixture is sized to pass 99.9 percent through a 325 mesh sieve, i.e., about 0.4 microns.

The preferred carbon blacks are those having relatively small average particle size, preferably within the range of from about 250 to about 350 Angstroms. The particle size of the iron black pigment per se does not have a substantial influence on the effectiveness of these compositions in improving tracking resistance although these pigments will generally have an average particle size within the range of from about 0.3 to 0.4 micron. The physical characteristics of all these additives including the magnesium oxide should, of course, be considered in view of facilitating the dispersion of those additives in the polymer matrix.

Examples of suitable foaming agents of both organic and inorganic chemical foaming agents that can be added to the compositions of the invention include azobisformamide, azobisisobutyronitrile, benzenesulfonylhydrazide, alkali metal carbonates and bicarbonates, ammonium carbonate, ammonium bicarbonate, and the like.

The foaming agents can be incorporated into the polymers in any suitable manner. One preferred procedure for incorporating the foaming agent or agents into the polymeric compositions of the invention is dry blending of the blowing agent with the composition according to the invention. Alternatively, a concentrate of blowing agent incorporated in a polymer can be substituted for the base polymer in sufficient amounts to give the desired final concentration of blowing agent in the blend.

Other materials can be incorporated into the polymers stabilized according to the invention prior to, together with, or subsequent to the addition of the above-described antioxidants and additives. These include the pigments, dyes, fillers, softeners, etc.

The concentration of black metal oxide pigment will be within the range of 1.0 to about 1.5 weight percent based on polymer. The carbon blacks, preferably easy processing channel black, are employed in concentrations of from 1.0 to about 1.25 weight percent, based on polymer. Concentrations of magnesium oxide vary within the range of 1.25 to 2.0 weight percent, based on the weight of the polymer in the composition.

It is also preferred that the compositions comprising the polymers resulting from the polymerization of at least one olefin monomer having from two to about eight carbon atoms also contain oxidation, ozonation and UV stabilizers. Stabilizers particularly preferred for this purpose are the hindered phenols, e.g., 2,6-di-tert-butyl-4-methylphenol, and the thioesters of long chain fatty alcohols, e.g., dilaurylthiodipropionate. As illustrated in the examples, the addition of these inhibitors results in compositions having greater tracking resistance than do compositions employing other stabilizers intended for the same purpose. Preferable concentrations of the hindered phenols are within the range of from about 0.02 to about 0.04 weight percent based on the weight of resin. The concentration of the thioesters employed are in the range of from about 0.025 to 0.050 weight percent. The amount of stabilizer present can be up to 0.1 weight percent based on weight of polymer or resin.

EXAMPLE I

The effectiveness of these compositions is illustrated in the following table which illustrates the conditions, compositions, and results of several comparative operations. High density polyethylene (density = 0.942 M.I. = 1–2) was employed in each of these runs and the polymer for each operation was obtained from the same sample stock to avoid any possibility of influencing the results of these comparison by variations in sample stock. The preferred carbon black employed was easy processing channel black Huber EPC. The preferred black metal oxide pigment employed was Kromotherm BK 900 (obtained from C. K. Williams & Co.), and the magnesium oxide employed where indicated on the table was analytical grade MgO. The Kromotherm BK 900 is a mixture of 25 percent iron oxide, 22 percent copper oxide, and 53 percent magnesium oxide, all by weight, having an average particle size of 325 mesh.

Referring to table 1, Run 1 is a control which contains carbon black and antioxidant but no metal oxide or magnesium oxide. This sample had a very poor rating and failed in approximately 11 hours.

Runs 2–11 are runs according to the invention for a polyethylene containing carbon black and various antioxidants, but additionally containing metal oxide pigment and magnesium oxide. Runs 4 and 6–10 contained the preferred antioxidants of BHT (2,6-di-tert-butyl-4-methylphenol) and DLTDP (dilaurylthiodipropionate). All of these runs had very high ratings and long hours before failures except for Runs 4 and 8. Run 4 contained an insufficient amount of magnesium oxide and Run 8 contained too much carbon black.

Run 12 contained two different carbon blacks plus magnesium oxide and the preferred antioxidants, but the product had a very poor rating.

TABLE 1

| Run No. | Channel black, 330° A. | Metal oxide pigment | MgO | Thermax black, 2,900° A. | BHT | DLTDP | Succonox 12 | Irganox 1010 | Santonox | Hours to failure | Rating |
|---|---|---|---|---|---|---|---|---|---|---|---|
| 1 | 2.5 | | | | | | | | 0.1 | 10.7 | Very poor. |
| 2 | 1.0 | 1.5 | 1.0 | | | | | | 0.1 | 67 | Do. |
| 3 | 1.0 | 1.5 | 1.0 | | | | | 0.1 | | 67.2 | Do. |
| 4 | 1.0 | 1.5 | | | 0.03 | 0.045 | | | | 51 | Do. |
| 5 | 1.0 | 1.5 | 1.0 | | | | | 0.1 | | 240 | Good. |
| 6 | 1.0 | 1.5 | 1.0 | | 0.03 | 0.045 | | | | 296 | Very good. |
| 7 | 1.25 | 1.25 | 1.0 | | 0.03 | 0.045 | | | | 538 | Excellent. |
| 8 | 1.5 | 1.0 | 1.0 | | 0.03 | 0.045 | | | | 8 | Very poor. |
| 9 | 1.0 | 1.5 | 1.0 | | 0.03 | 0.045 | | | | 345 | Excellent. |
| 10 | 1.25 | 1.25 | 1.0 | | 0.03 | 0.045 | | | | 474 | Do. |
| 11 | 1.25 | 1.25 | 1.0 | | | | | 0.1 | | 54 | Very poor. |
| 12 | 1.0 | | 1.0 | 1.5 | 0.03 | 0.045 | | | | 67 | Do. |

NOTES:
BHT—2,6-di-tert-butyl-4-methylphenol.
DLTDP—dilaurylthiodipropionate.
Succonox 12—N-lauryl p-aminophenol.
Irganox 1010—tetrakis[3,5-ditert-butyl-4-hydroxyphenyl)propionyloxymethyl]methane.
Santonox—4,4'-thio-bis(6-tert-m-cresol).
Hours to failure—ASTM D 2132-62T.

EXAMPLE II

Another series of runs were conducted according to the invention wherein polyethylene having a density of 0.942, a melt index of 5.5 and containing 1 weight percent carbon black (easy processing channel black) and 0.03 percent BHT and 0.045 percent DLTDP, and which also contained at least 1 of iron oxide, copper oxide or magnesium oxide, was employed. The results are summarized in the following table.

TABLE 2

| Run | $Fe_3O_4$, percent | CuO | MgO | Hours to failure | Type of failure | Rating |
|---|---|---|---|---|---|---|
| Control | | | | 10.7 | Tracking | Very poor. |
| 1 | 1.0 | 0 | 0 | 270 | Erosion | Very good. |
| 2 | 0 | 1.0 | 0 | 199 | do | Acceptable. |
| 3 | 1.0 | 0 | 1.5 | 404 | do | Excellent. |
| 4 | 0 | 1.0 | 1.5 | 133 | do | Poor. |
| 5 | 0.5 | 0.5 | 0 | 208 | do | Good. |
| 6 | 0.5 | 0.5 | 1.5 | 187 | do | Acceptable. |
| 7 | 0.3 | 0.7 | 1.5 | 184 | do | Do. |
| 8 | 0.7 | 0.3 | 1.5 | 112 | do | Poor. |

It will be observed from the above table that acceptable articles were obtained when using either iron oxide or copper oxide at 1 weight percent levels without magnesium oxide present. This is illustrated by Runs 1 and 2. It will be noted from Run 3 that the addition of 1.5 weight percent magnesium oxide to polyethylene containing 1 percent iron oxide resulted in an outstanding product which did not fail until about 400 hours. The use of copper oxide along with magnesium oxide as illustrated by Run 4 did not result in as desirable a product as Run 3.

Runs 5-8 illustrate the effectiveness of various ratios of iron oxide to copper oxide with and without magnesium oxide present.

As is illustrated by the data presented above, it is pretty well established that iron oxide ($Fe_3O_4$) greatly improves the tracking resistance of the polymer. The addition of magnesium oxide further increases the tracking resistance. Also, as demonstrated by the above examples, a combination of iron oxide and copper oxide with magnesium oxide is also effective.

The test procedure for evaluating various samples in examples I and II is as follows:

The tests were made in accordance with the procedure given in ASTM–D2132–62T. The apparatus was constructed by Phillips Petroleum Company in its Electro-Mechanical Laboratory shop following the specifications given in the cited ASTM method. The water was tap water which, in Bartlesville, Okla., is chlorinated and fluorided.

We claim:
1. A stabilized composition comprising:
   1. an electrically carbonizable matrix and
   2. a stabilizing amount of a tracking resistant additive mixture comprising
      a. 1.0–1.25 weight percent carbon black with
      b. 1.0–1.5 weight percent of a heavy metal oxide pigment selected from the group consisting of iron oxide and copper oxide or
      c. 1.0–1.5 weight percent of a heavy metal oxide selected from the group consisting of iron oxide and copper oxide and 1.25–2.00 weight percent magnesium oxide.
2. The composition of claim 1 wherein said carbonizable matrix is a polymer of at least one olefin monomer having from two to about eight carbon atoms.
3. The composition of claim 2 further comprising a chemically stabilizing amount of at least one of hindered phenols and thioesters of long chain fatty alcohols.
4. The composition of claim 3 wherein said phenol is 2,6-di-tert-butyl-4-methylphenol and said thioester is a dilaurylthiodipropionate.
5. The composition of claim 3 wherein said composition comprises from 0.02 to about 0.04 weight percent of said hindered phenol, about 0.025 to about 0.050 weight percent of said thioester, said metal oxide pigment has an average particle size within the range of from about 0.3 to about 0.4 microns, and said carbon black has an average particle size within the range of from about 250 to about 350 Angstroms.
6. The composition of claim 5 wherein said olefin polymer is polyethylene, said metal oxide is a metal oxide black pigment and said hindered phenol is 2,6-di-tert-butyl-4-methylphenol and said thioester is dilaurylthiodipropionate.
7. The composition of claim 3 wherein said olefin polymer is polyethylene, said metal oxide is a metal oxide black pigment and said composition comprises from about 0.02 to about 0.04 percent of said hindered phenol and from about 0.025 to about 0.050 percent of said thioester.
8. The composition of claim 7 wherein said hindered phenol is 2,6-di-tert-butyl-4-methylphenol and said thioester is dilaurylthiodipropionate.

\* \* \* \* \*